United States Patent
Yamaguchi et al.

(10) Patent No.: US 10,773,662 B2
(45) Date of Patent: Sep. 15, 2020

(54) ROUTING STRUCTURE OF ELECTRICAL WIRES AND WIRE HARNESS

(71) Applicant: Yazaki Corporation, Tokyo (JP)

(72) Inventors: Yasuhiro Yamaguchi, Shizuoka (JP); Hayato Iizuka, Shizuoka (JP); Takeshi Innan, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/531,141

(22) Filed: Aug. 5, 2019

(65) Prior Publication Data

US 2020/0070747 A1    Mar. 5, 2020

(30) Foreign Application Priority Data

Sep. 5, 2018 (JP) ................................. 2018-166052

(51) Int. Cl.
| | |
|---|---|
| *H01F 17/06* | (2006.01) |
| *B60R 16/02* | (2006.01) |
| *H01F 37/00* | (2006.01) |
| *H01F 27/24* | (2006.01) |
| *H01F 27/26* | (2006.01) |

(52) U.S. Cl.
CPC ....... *B60R 16/0215* (2013.01); *H01F 17/062* (2013.01); *H01F 27/24* (2013.01); *H01F 27/263* (2013.01); *H01F 37/00* (2013.01); *H01F 27/266* (2013.01)

(58) Field of Classification Search
CPC ........ H01F 17/062; H01F 17/06; H01F 27/00; H01F 27/24; H01F 27/28; H01F 27/263; H01F 27/266; B60R 16/0207; H02H 3/20; H02H 9/04; H02H 9/044
See application file for complete search history.

(56) References Cited

U.S. PATENT DOCUMENTS

| | | | |
|---|---|---|---|
| 349,611 A | 9/1886 | Stanley | |
| 3,346,828 A * | 10/1967 | Buschman | ............ H01F 27/263 336/192 |
| 3,538,474 A | 11/1970 | Olsen | |
| 4,334,206 A * | 6/1982 | Nakamura | ............ H01F 27/263 336/178 |
| 5,289,153 A * | 2/1994 | Gross | ..................... H01F 27/266 336/210 |
| 5,581,224 A | 12/1996 | Yamaguchi | |
| 5,726,611 A * | 3/1998 | Takagi | ..................... H01F 17/06 333/181 |

(Continued)

FOREIGN PATENT DOCUMENTS

| | | |
|---|---|---|
| EP | 0 626 767 A2 | 11/1994 |
| EP | 3 226 265 A1 | 10/2017 |

(Continued)

*Primary Examiner* — Steven T Sawyer
(74) *Attorney, Agent, or Firm* — Kenealy Vaidya LLP (57) ABSTRACT

A routing structure of electrical wires and a wire harness include multi-phase electrical wires and a magnetic core having a ring shape, around which the electrical wires are winded. The magnetic core has a division type in which the first component constituting a part of the ring shape, and the second component constituting a remaining part of the ring shape are connected. The electrical wires with all the phases may be winded around the first component.

5 Claims, 7 Drawing Sheets

(56) References Cited

U.S. PATENT DOCUMENTS

| | | | |
|---|---|---|---|
| 6,163,238 A * | 12/2000 | Nestlerode | H01F 17/06 333/32 |
| 6,313,727 B1 * | 11/2001 | Gabriel | G01R 15/181 336/174 |
| 6,400,579 B2 | 6/2002 | Cuk | |
| 7,057,489 B2 | 6/2006 | Nathasingh | |
| 7,312,686 B2 | 12/2007 | Bruno | |
| 7,443,274 B2 | 10/2008 | Lee | |
| 9,379,629 B2 | 6/2016 | Chandrasekaran | |
| 2006/0006976 A1 * | 1/2006 | Bruno | H01F 27/263 336/229 |
| 2007/0262839 A1 * | 11/2007 | Bosley | H01F 27/255 335/297 |
| 2008/0001693 A1 * | 1/2008 | Hahn | H01F 3/12 336/83 |
| 2010/0254168 A1 | 10/2010 | Chandrasekaran | |
| 2011/0287712 A1 | 11/2011 | Conway | |
| 2015/0228401 A1 | 8/2015 | Ratz | |
| 2017/0174152 A1 * | 6/2017 | Yamaguchi | H01F 17/062 |

FOREIGN PATENT DOCUMENTS

| | | |
|---|---|---|
| EP | 3 373 395 A1 | 9/2018 |
| GB | 2 179 502 A | 3/1987 |
| JP | 60-50909 A | 3/1985 |
| JP | 6-2638 U | 1/1994 |
| JP | 2012-134028 A | 7/2012 |
| JP | 2012-230851 A | 11/2012 |

* cited by examiner

ROUTING STRUCTURE OF ELECTRICAL WIRES AND WIRE HARNESS

CROSS-REFERENCE TO RELATED APPLICATION(S)

The present application claims priority to and incorporates by reference the entire contents of Japanese Patent Application No. 2018-166052 filed in Japan on Sep. 5, 2018.

BACKGROUND OF THE INVENTION

1. Field of the Invention

The present invention relates to a routing structure of electrical wires and a wire harness.

2. Description of the Related Art

In a vehicle such as a hybrid vehicle and an electrical vehicle, conventionally, three-phase electrical wires connect between an inverter and a motor, and power supply is performed from the inverter to the motor. In such power supply from the inverter to the motor, by voltage with steep rising that is included in output from the inverter, excessive surge voltage is generated in a wire harness connecting the inverter and the motor, and is input into the motor in some cases.

As a method for suppressing such surge voltage, winding an electrical wire around a magnetic core is effective. Here, if there are multi-phase electrical wires, it is preferable to wind the multi-phase electrical wires around one magnetic core from the viewpoint of miniaturizing a routing space. Japanese Patent Application Laid-open No. 2012-230851 discloses a technique of a wire harness including a primary coil formed by winding a plurality of AC lines around a ring-shaped ferrite core.

However, the above-described conventional wire harness technique has still room for improvement in miniaturization of a space required for routing. For example, in the case of winding an electrical wire around a ring-shaped magnetic core, a working clearance gap for passing through the electrical wire is needed in an inner diameter side of the magnetic core. If a compact magnetic core in which the working clearance gap is omitted, or reduced can be used, the miniaturization of a routing space can be achieved.

SUMMARY OF THE INVENTION

An object of the present invention is, therefore, to provide a routing structure of electrical wires and a wire harness that can realize miniaturization of a routing space.

In order to achieve the above-mentioned object, a routing structure of electrical wires according to one aspect of the present invention includes multi-phase electrical wires, and a magnetic core having a ring shape, around which the electrical wires are winded, wherein the magnetic core has a division type in which a first component constituting a part of the ring shape, and a second component constituting a remaining part of the ring shape are connected.

According to another aspect of the present invention, in the routing structure of electrical wires, the electrical wires with all phases may be winded around the first component.

According to still another aspect of the present invention, in the routing structure of electrical wires, in the first component, the electrical wires may be winded around a portion extending in a direction orthogonal to a routing direction of the electrical wires.

A wire harness according to still another aspect of the present invention includes multi-phase electrical wires, a magnetic core having a ring shape, around which the electrical wires are winded, and a connection portion provided at a terminal of the electrical wires, wherein the magnetic core has a division type in which a first component constituting a part of the ring shape, and a second component constituting a remaining part of the ring shape are connected.

The above and other objects, features, advantages and technical and industrial significance of this invention will be better understood by reading the following detailed description of presently preferred embodiment of the invention, when considered in connection with the accompanying drawings.

DETAILED DESCRIPTION OF THE PREFERRED EMBODIMENTS

A routing structure of electrical wires and a wire harness according to an embodiment of the present invention will be described in detail below with reference to the drawings. Note that the present invention is not limited to the embodiment. In addition, components in the following embodiment include ones easily-conceived by those skilled in the art, or ones that are substantially identical.

Embodiment

Figure 1:
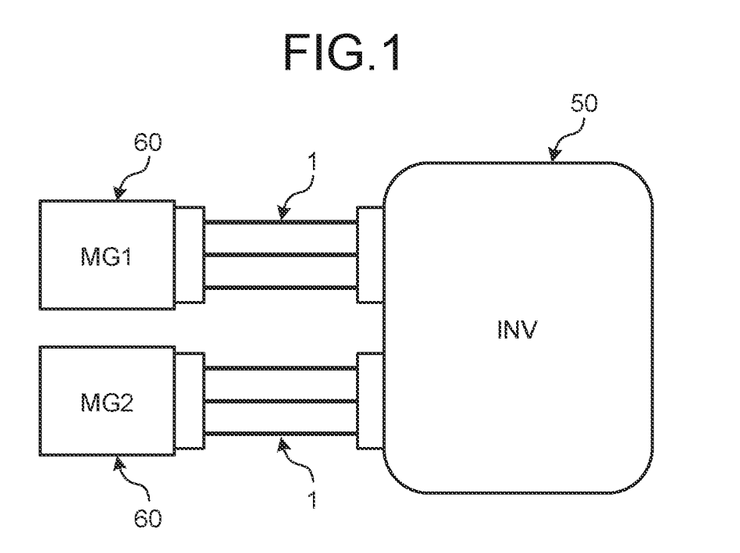
FIG. 1 is a schematic diagram illustrating a configuration in which motors and an inverter are connected by a wire harness according to an embodiment.
Figure 2:
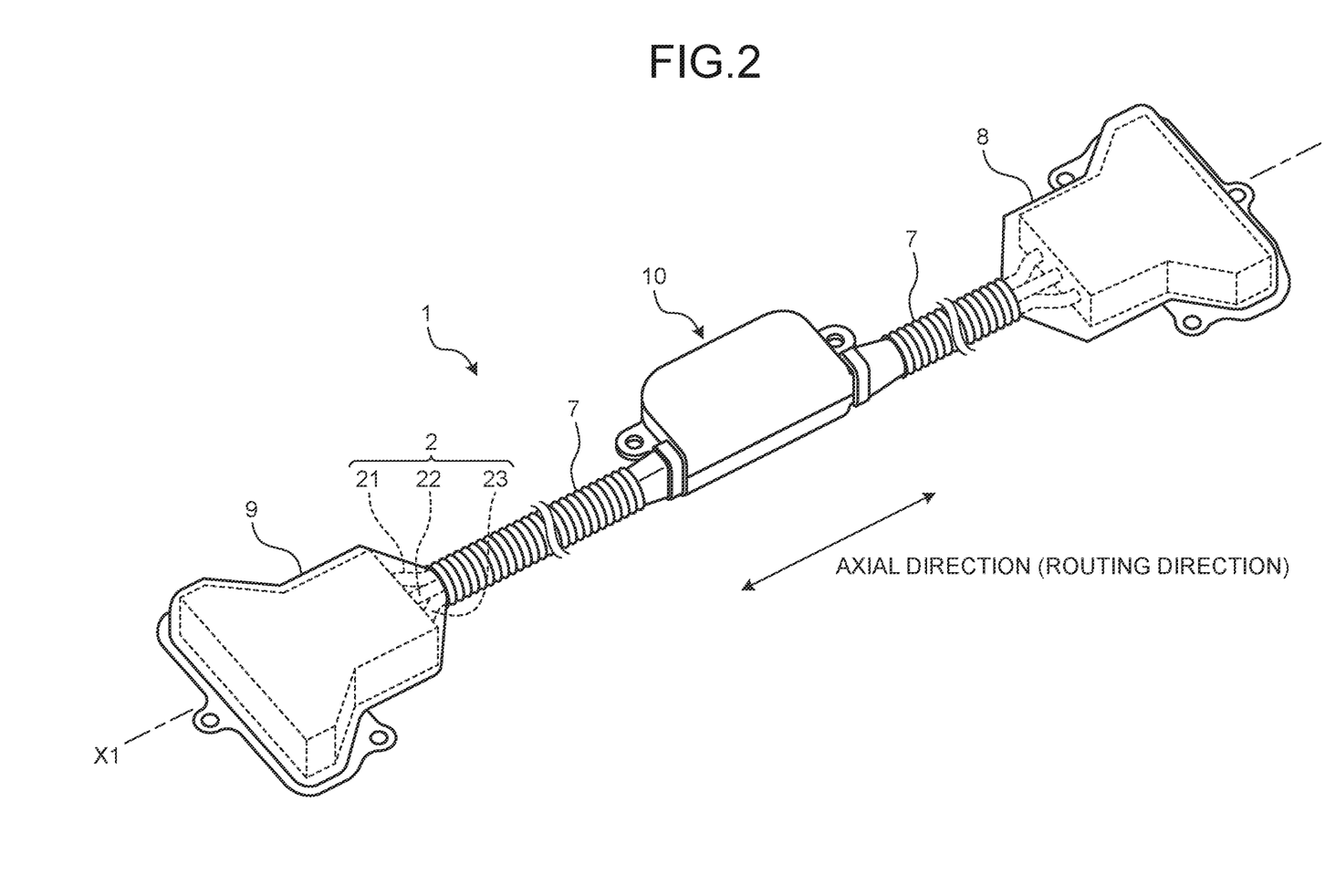
FIG. 2 is a perspective view of the wire harness according to the embodiment.

An embodiment of the present invention will be described with reference to FIGS. 1 to 8. The present embodiment relates to a routing structure of electrical wires and a wire harness. FIG. 1 is a schematic diagram illustrating a configuration in which motors and an inverter are connected by the wire harness according to the embodiment, and FIG. 2 is a perspective view of the wire harness according to the embodiment. Note that, instead of a plurality of motors, at least one motor may be provided.

An inverter (INV) 50 and motors MG1, MG2 60 illustrated in FIG. 1 are mounted on a vehicle such as a hybrid vehicle and an electrical vehicle. The inverter 50 is a conversion device that converts a direct-current output from a power source (not illustrated) mounted on the vehicle, into a three-phase alternating-current output. The inverter 50 may output a PWM (pulse width modulation) waveform, or may output a sinusoidal waveform. The motors 60 are devices driven by the three-phase alternating-current output from the inverter 50, and are Y-shaped (star) connection three-phase motors, for example.

A wire harness 1 according to the embodiment is used as a power supply line that connects the above-described three-phase alternating-current-type inverter (INV) 50 and the motors MG1, MG2 60. For example, the wire harness 1 is laid below a floor panel forming a vehicle body, so as to extend in a vehicle front-back direction. As illustrated in FIG. 2, the wire harness 1 is a three-phase electrical wire including a three-phase three-line system electrical wire group that supplies three-phase alternating-current power using three electrical wires 21, 22, and 23.

Figure 3:
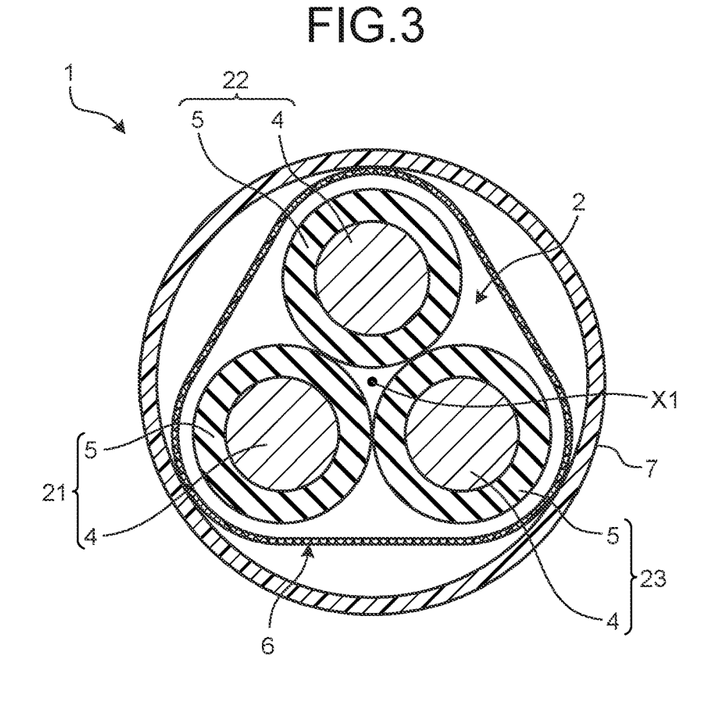
FIG. 3 is a cross-sectional view of an electrical wire portion of the wire harness according to the embodiment.

As illustrated in FIG. 2, the wire harness 1 of the embodiment includes an electrical wire portion 2, a corrugated tube 7, an inverter side connector 8, a motor side connector 9, and a casing 10. The electrical wire portion 2 includes the three-phase electrical wires 21, 22, and 23 that are held together in the same direction. The inverter side connector 8 and the motor side connector 9 are examples of connection portions provided at terminals of the electrical wires 21, 22, and 23. The inverter side connector 8 is connected to one end of the electrical wire portion 2, and connects the electrical wire portion 2 to the inverter 50. The motor side connector 9 is connected to the other end of the electrical wire portion 2, and connects the electrical wire portion 2 to the motor 60. As illustrated in FIG. 3, an outer circumference side of the electrical wire portion 2 is covered by a cylindrical braided wire 6 (shield member) and the corrugated tube 7 (protection member).

As illustrated in FIG. 3, the three-phase electrical wires 21, 22, and 23 of the electrical wire portion 2 extend along a predetermined central axis line X1, and are disposed at equal intervals in a circumferential direction around the central axis line X1. Each of the three-phase electrical wires 21, 22, and 23 is a non-shield type electrical wire, and includes a conductive body portion 4 having a circular cross section, and an insulating potion 5 covering an outer circumference of the conductive body portion 4. As illustrated in FIG. 3, cross sectional shapes of the electrical wires 21, 22, and 23 in a cross section orthogonal to the central axis line X1 are a substantially circular shape. For example, the conductive body portion 4 of each of the electrical wires 21, 22, and 23 is formed of a stranded wire obtained by spirally stranding a plurality of wires made of metal (aluminum alloy, copper alloy, etc.), a rod-shaped single core line, or the like. For example, the insulating potion 5 of each of the electrical wires 21, 22, and 23 is formed of a synthetic resin.

In a transverse cross-section illustrated in FIG. 3, the electrical wires 21, 22, and 23 of the electrical wire portion 2 are disposed such that respective central axes (centroid points) form a substantially triangular shape, that is, are disposed in a so-called pyramid piled manner. In addition, the three-phase electrical wires 21, 22, and 23 are disposed such that two electrical wires adjacent in the circumferential direction around the central axis line X1 can be in contact with each other. Because both of the conductive body portion 4 and the insulating potion 5 of each of the electrical wires 21, 22, and 23 have plasticity, the electrical wire portion 2 can be bent and deformed.

The braided wire 6 is formed by interweaving, like a net, wires (metal fine lines) made of metal (e.g., copper alloy), and forms a cylindrical shape as a whole. The braided wire 6 functions as a shield member that suppresses noise by entirely surrounding the outer circumference side of the electrical wire portion 2. By plasticity or the like of the wire, the braided wire 6 can freely perform expansion and contraction, and deformation in accordance with bending deformation of the electrical wire portion 2.

The corrugated tube 7 is a tube made of a synthetic resin, and is formed into an accordion shape, for example. The corrugated tube 7 can freely perform elastic deformation, and favorably hold a cylindrical shape by elastic restoring force. The corrugated tube 7 accommodates the electrical wire portion 2 and the braided wire 6 inside the cylindrical shape, and covers and protects the outer circumference side of the electrical wire portion 2.

The casing 10 is disposed between the inverter side connector 8 and the motor side connector 9 in a routing direction of the electrical wire portion 2. The routing direction of the electrical wire portion 2 is a direction in which the electrical wire portion 2 extends, and in the wire harness 1 according to the present embodiment, is a direction of the central axis line X1 connecting the inverter side connector 8 and the motor side connector 9. As illustrated in FIG. 2, the casing 10 of the present embodiment is disposed at an intermediate portion of the inverter side connector 8 and the motor side connector 9. The shape of the casing 10 has a hollow parallelepiped shape. One end in a longitudinal direction of the casing 10 is communicated with the corrugated tube 7 on the inverter side connector 8 side, and the other end is communicated with the corrugated tube 7 on the motor side connector 9 side.

Figure 4:
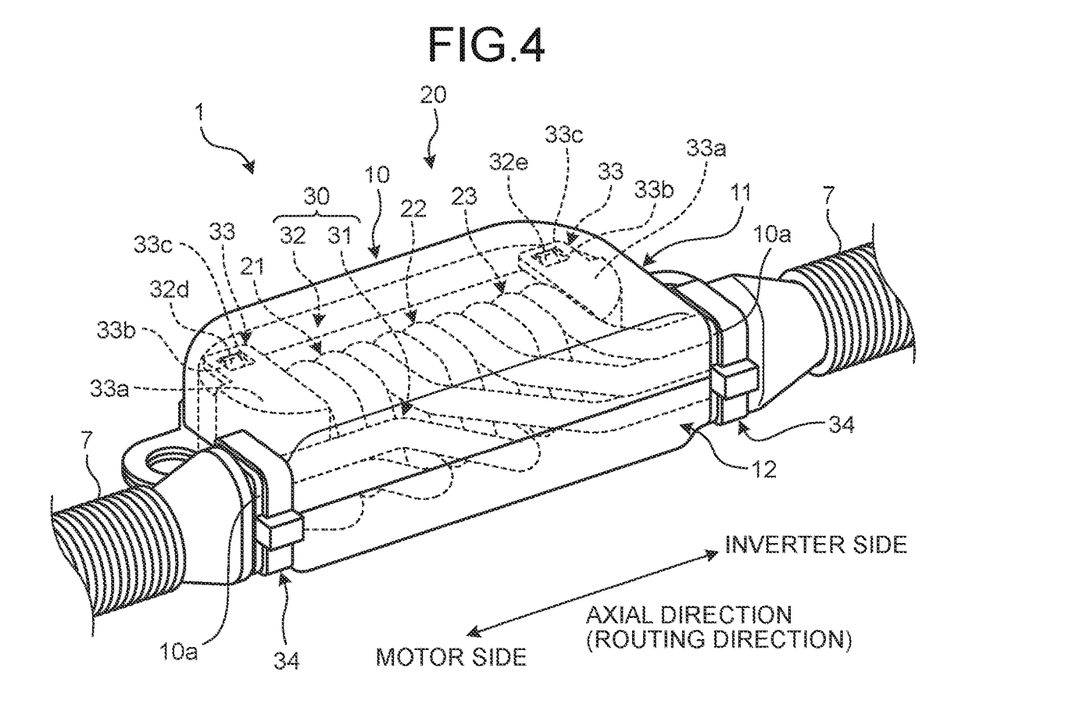
FIG. 4 is a perspective view of a routing structure of electrical wires according to the embodiment.
Figure 5:
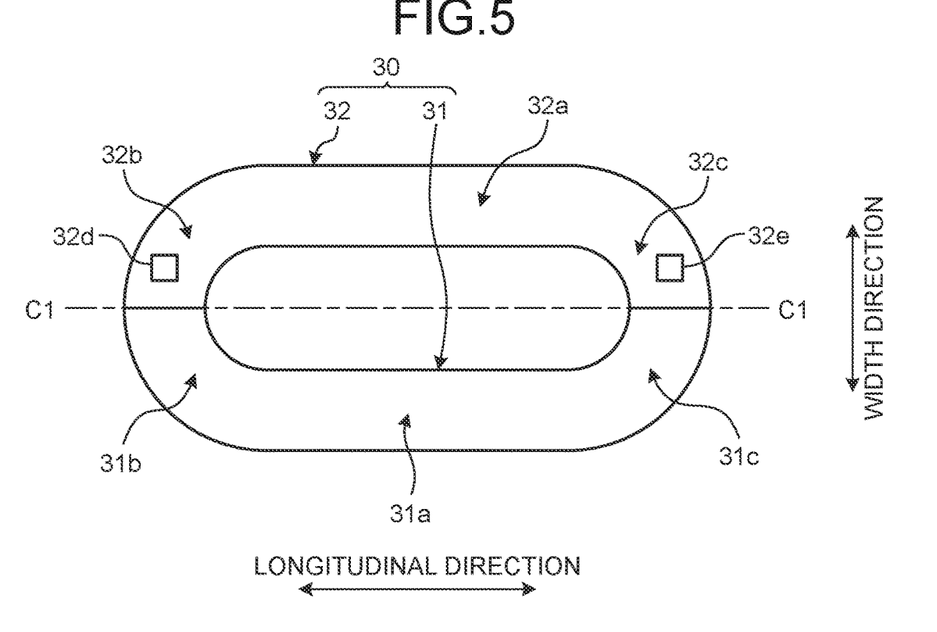
FIG. 5 is a plan view of a magnetic core according to the embodiment.
Figure 6:
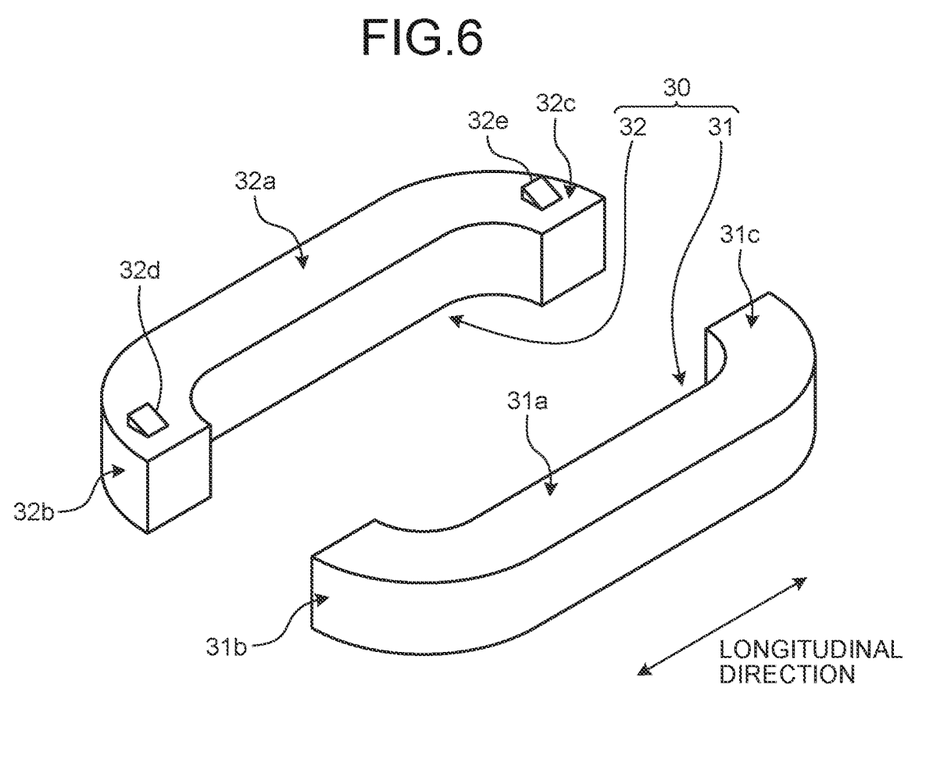
FIG. 6 is a perspective view of the magnetic core according to the embodiment.

A routing structure 20 of electrical wires of the present embodiment that is illustrated in FIG. 4 includes the electrical wires 21, 22, and 23, and a magnetic core 30 having a ring shape. The magnetic core 30 is formed of a magnetic body (e.g., ferromagnetic body such as ferrite). As illustrated in FIGS. 5 and 6, the magnetic core 30 includes a first component 31 and a second component 32. A planar shape of the magnetic core 30 is a shape in which both end portions in a longitudinal direction of a rectangle are rounded into a semicircular shape. The first component 31 and the second component 32 are substantially symmetric with respect to a center line C1 in the longitudinal direction of the magnetic core 30. The first component 31 includes a square-column-shaped columnar portion 31a, and curved portions 31b and 31c provided at both ends of the columnar portion 31a. The curved portion 31b and the curved portion 31c are curved in an arc shape, and bent from the columnar portion 31a toward the same direction. End surfaces of the curved portions 31b and 31c are orthogonal to a width direction of the magnetic core 30. Similarly to the first component 31, the second component 32 includes a square-column-shaped columnar portion 32a, and curved portions 32b and 32c curved in an arc shape. End surfaces of the curved portions 32b and 32c are orthogonal to the width direction of the magnetic core 30.

The second component 32 includes engagement protrusions 32d and 32e. The engagement protrusions 32d and 32e are respectively provided on a front surface and a rear surface of the second component 32. The first engagement protrusion 32d is disposed in the curved portion 32b, and the second engagement protrusion 32e is disposed in the curved portion 32c.

As illustrated in FIG. 4, the magnetic core 30 around which the electrical wires 21, 22, and 23 are winded is accommodated inside the casing 10. The magnetic core 30 is accommodated inside the casing 10 such that the longitudinal direction becomes parallel to the routing direction. All of the electrical wires 21, 22, and 23 are winded around the first component 31. More specifically, in the routing structure 20 of electrical wires of the present embodiment, the first-phase electrical wire 21 is winded around one end side (for example, motor side) of the first component 31, the second-phase electrical wire 22 is winded around a center portion, and the third-phase electrical wire 23 is winded around the other end side (for example, inverter side). Each of the electrical wires 21, 22, and 23 with the respective phases is spirally winded around the first component 31 a plurality of times.

Figure 7:
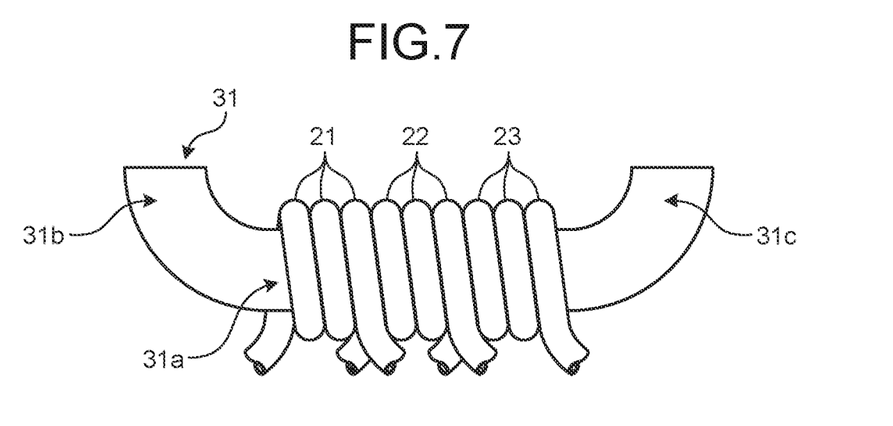
FIG. 7 is a plan view of a first component around which electrical wires are winded.

Procedures of winding and assembly of the electrical wires 21, 22, and 23 with respect to the magnetic core 30 will be described. The winding of the electrical wires 21, 22, and 23 with respect to the magnetic core 30 is performed in a state in which the first component 31 and the second component 32 are separated. As illustrated in FIG. 7, the electrical wires 21, 22, and 23 are winded around the first component 31 that is before being connected to the second component 32. The winding can be performed in an arbitrary order. For example, the first-phase electrical wire 21, the second-phase electrical wire 22, and the third-phase electrical wire 23 are winded in this order around the columnar portion 31a of the first component 31. In addition, an electrostatic capacitance C among the electrical wires 21, 22, and 23 with different phases is desirably set to be small from the viewpoint of achieving impedance matching among the motor 60, the wire harness 1, and the inverter 50 by using a large value as a cable impedance of the wire harness 1. Thus, in performing the winding with respect to the columnar portion 31a, clearance gaps are preferably provided between the first-phase electrical wire 21 and the second-phase electrical wire 22, and between the second-phase electrical wire 22 and the third-phase electrical wire 23.

Figure 8:
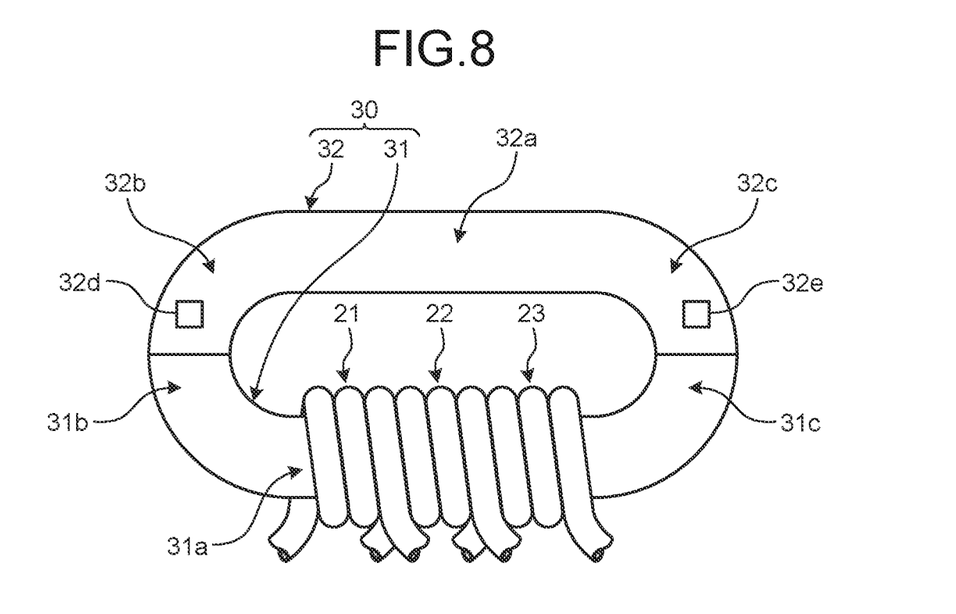
FIG. 8 is a plan view of the magnetic core around which electrical wires are winded.

If the winding of the electrical wires 21, 22, and 23 with respect to the first component 31 is completed, as illustrated in FIG. 8, the first component 31 and the second component 32 are combined. By bringing the end surfaces of the curved portions 32b and 32c of the second component 32 into contact with the end surfaces of the curved portions 31b and 31c of the first component 31, a ring shape is formed by the two components 31 and 32. The first component 31 and the second component 32 are connected by connection members 33 illustrated in FIG. 4. The connection members 33 connect the first component 31 and the second component 32 at the both end portions in the longitudinal direction of the magnetic core 30. The connection members 33 include holding portions 33a that hold the end portions of the first component 31, and engagement portions 33b to be engaged with the engagement protrusions 32d and 32e of the second component 32. A planar shape of the holding portions 33a has a curved shape according to the shape of the curved portions 31b and 31c of the first component 31. The engagement portions 33b are plate-like portions protruding from the holding portions 33a, and sandwich the second component 32 from the front surface side and the rear surface side. Engagement holes 33c are provided in the engagement portions 33b. The engagement holes 33c engage with the engagement protrusions 32d and 32e of the second component 32, to bring the first component 31 and the second component 32 into contact with each other. In other words, by the engagement holes 33c engaging with the engagement protrusions 32d and 32e in a state in which the holding portions 33a hold the first component 31, the first component 31 and the second component 32 contact each other, to form a ring-shaped magnetic body.

The first component 31 and the second component 32 connected by the connection members 33 are accommodated inside the casing 10 together with the electrical wires 21, 22, and 23. The casing 10 has a division type in which a front surface side casing 11 covering the front surface side of the magnetic core 30, and a rear surface side casing 12 covering the rear surface side of the magnetic core 30 are connected. Cylindrical opening portions 10a are provided in a motor side end portion and an inverter side end portion of the casing 10. The opening portions 10a are each formed by combining a semicylinder portion provided on the front surface side the casing 11, and a semicylinder portion provided on the rear surface side casing 12. The electrical wires 21, 22, and 23 are passed through the opening portions 10a. The corrugated tube 7 is fitted with the opening portions 10a, and fixed to the opening portions 10a by fixing members 34 such as a banding band.

As described above, the routing structure 20 of electrical wires of the present embodiment includes the multi-phase electrical wires 21, 22, and 23, and the magnetic core 30 having a ring shape, around which the electrical wires 21, 22, and 23 are winded. The electrical wires 21, 22, and 23 are winded around the magnetic core 30 at positions different for the respective phases. Depending on properties (magnetic permeability, cross-sectional area, magnetic path length) of the magnetic core 30, and the number of windings of the electrical wires 21, 22, and 23 with respect to the magnetic core 30, an inductance L of the electrical wire portion 2 is controlled to become a desired value. A target value of the inductance L is established so as to optimize a degree of impedance matching of the entire circuit (the inverter 50, the wire harness 1, the motor 60), for example. By achieving impedance matching of the entire circuit, reflection of surge voltage among the inverter 50, the wire harness 1, and the motor 60 can be suppressed, and surge can be preferably suppressed.

The magnetic core 30 is of a division type in which the first component 31 constituting a part of the ring shape, and the second component 32 constituting a remaining part of the ring shape are connected. Because the magnetic core 30 is of the division type, the magnetic core 30 can be miniaturized as described below. In the case of winding the multi-phase electrical wires 21, 22, and 23 around a magnetic core having a ring shape that cannot be divided, a working clearance gap used when the electrical wires 21, 22, and 23 are passed to an inner diameter side (hollow portion) of the magnetic core becomes necessary.

In contrast to this, in the routing structure 20 of electrical wires of the present embodiment, the magnetic core 30 is of the division type. Thus, the electrical wires 21, 22, and 23 can be winded around one component (e.g., the first component 31) in a divided state, and then, the two components 31 and 32 can be connected. Thus, on the inner diameter side of the magnetic core 30, it is only required that a region storing the winded electrical wires 21, 22, and 23 is secured, and a working clearance gap used when the electrical wires 21, 22, and 23 are passed becomes unnecessary. Thus, in the routing structure 20 of electrical wires of the present embodiment, the magnetic core 30 can be miniaturized. In addition, by making a diameter of the magnetic core 30 small, a space factor can be made higher. The miniaturization of a routing space is realized by the miniaturization of the magnetic core 30.

By winding the electrical wires 21, 22, and 23 with all phases around the first component 31 as in the present embodiment, a space factor can be made higher. For example, by winding the electrical wires 21, 22, and 23 around the first component 31 with bringing the adjacent electrical wires with two phases into contact with each other, the generation of an unnecessary clearance gap can be suppressed, and a space factor can be maximized.

First Modified Example of Embodiment

Figure 9:
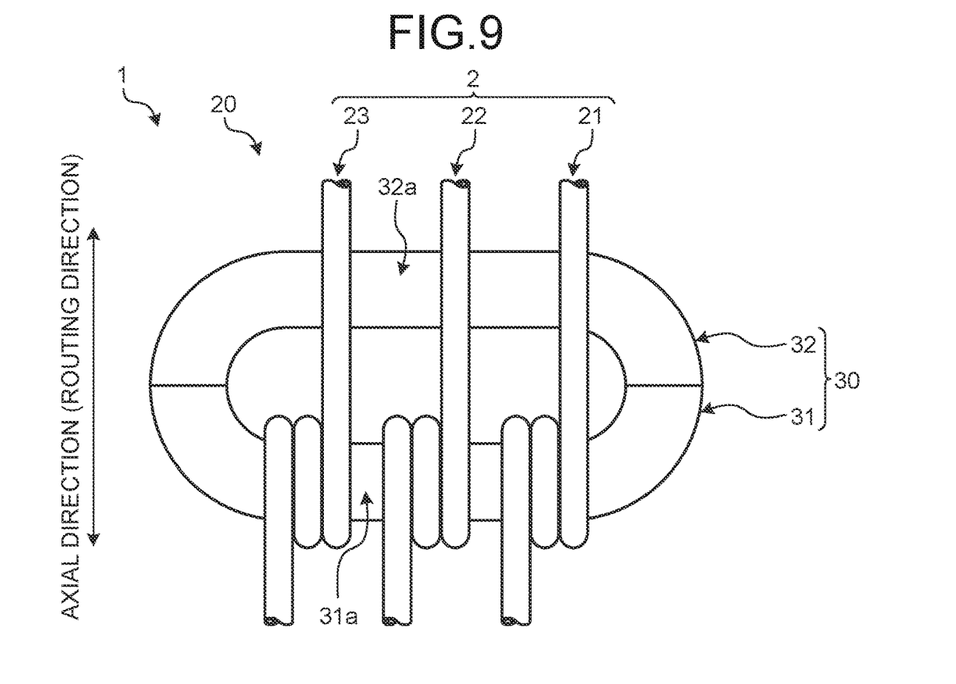
FIG. 9 is a main part plan view of a routing structure of electrical wires according to a first modified example of the embodiment.
Figure 10:
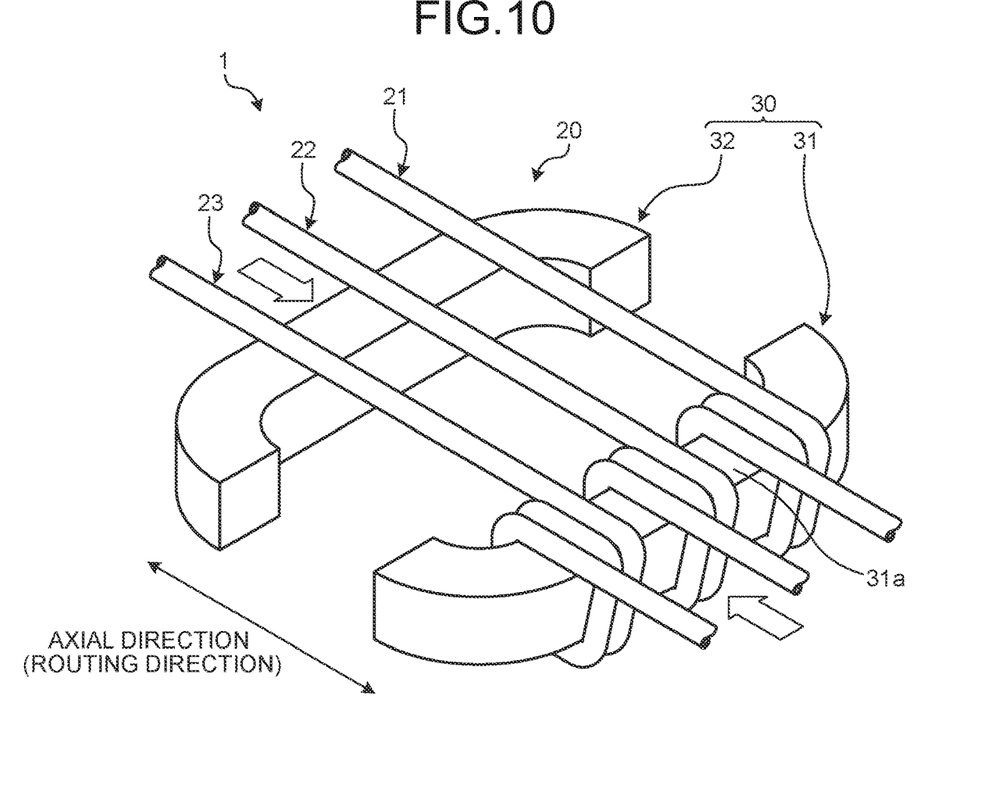
FIG. 10 is a main part perspective view of the routing structure of electrical wires according to the first modified example of the embodiment.
Figure 11:
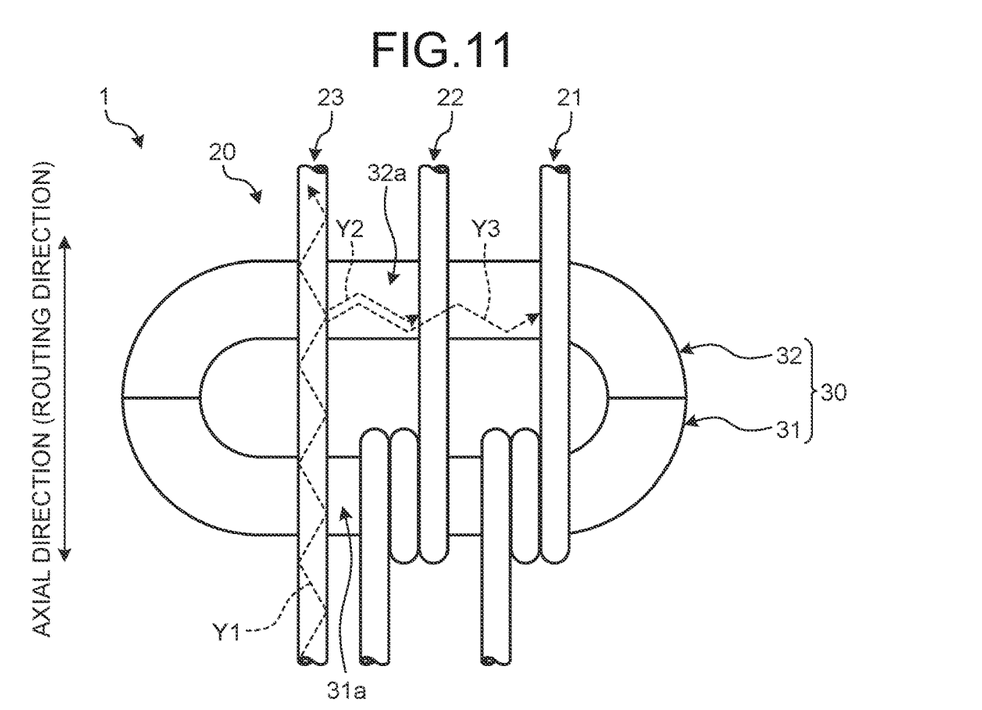
FIG. 11 is a plan view illustrating propagation of noise in a comparative example.

The first modified example of the embodiment will be described with reference to FIGS. 9 to 11. FIG. 9 is a main part plan view of a routing structure of electrical wires according to the first modified example of the embodiment, FIG. 10 is a main part perspective view of the routing structure of electrical wires according to the first modified example of the embodiment, and FIG. 11 is a plan view illustrating propagation of noise in a comparative example. The first modified example is different from the above-described embodiment in that the columnar portion 31a extends in a direction orthogonal to a routing direction of the electrical wire portion 2.

As illustrated in FIG. 9, in the first modified example, the magnetic core 30 is disposed such that a direction in which the columnar portion 31a extends is orthogonal to the routing direction. For example, the magnetic core 30 is disposed inside a casing 10 substantially similar to that in the above-described embodiment, such that the columnar portion 31a is orthogonal to the routing direction. Similarly to the above-described embodiment, first, the electrical wires 21, 22, and 23 with the respective phases are winded around the first component 31 being a single body, and then, the first component 31 and the second component 32 are combined as illustrated in FIG. 10. In addition, the first component 31 and the second component 32 are connected by the connection members 33 or the like, which are not illustrated in FIGS. 9 and 11. The electrical wires 21, 22, and 23 with all the phases are winded around the columnar portion 31a of the first component 31. In other words, the electrical wires 21, 22, and 23 with all the phases are winded around a portion of the first component 31 that extends in a direction orthogonal to the routing direction of the electrical wire portion 2.

This suppresses propagation of noise among the electrical wires 21, 22, and 23 with different phases. As an example of comparison, as illustrated in FIG. 11, it is assumed that the first-phase electrical wire 21 and the second-phase electrical wire 22 are winded around the magnetic core 30, and the third-phase electrical wire 23 is not winded around. In the third-phase electrical wire 23 not winded around the magnetic core 30, noise passes through the vicinity of the columnar portion 31a without being reduced, as indicated by an arrow Y1. Noise is thereby propagated from the third-phase electrical wire 23 to the first-phase electrical wire 21 and the second-phase electrical wire 22 in a region on a downstream side of the columnar portion 31a in a traveling direction of noise, as indicated by arrows Y2 and Y3.

In contrast to this, in the routing structure 20 of electrical wires of the first modified example, the electrical wires 21, 22, and 23 with all the phases are winded around the one magnetic core 30, and winded around a portion extending in a direction orthogonal to the routing direction of the electrical wire portion 2. The description will be given using a specific configuration of the first modified example. The electrical wires 21, 22, and 23 with all the phases are winded around the columnar portion 31a of the first component 31. The electrical wires 21, 22, and 23 (on a power source side) connected with the inverter 50 are positioned on one side in the routing direction across the columnar portion 31a, and the electrical wires 21, 22, and 23 (on a load side) connected with the motor 60 are positioned on an opposite side. In this manner, in the routing structure, a portion provided on the power source side of portions of the electrical wires 21, 22, and 23 that are winded around the magnetic core 30, and a portion provided on the load side of the winded portions of the electrical wires 21, 22, and 23 are not adjacent.

First of all, because the electrical wires 21, 22, and 23 with all the phases are winded around the magnetic core 30, even if noise is generated in the electrical wire 21, 22, or 23 of any phase, the noise is removed while passing through the portion winded around the magnetic core 30. On the power source side of the magnetic core 30, if noise propagates from the electrical wire 21, 22, or 23 with one phase to the electrical wire 21, 22, or 23 with another phase, the noise is removed when reaching the magnetic core 30. In addition, the portions of the electrical wires 21, 22, and 23 that are provided on the power source side of the magnetic core 30, and the portions provided on the load side are not adjacent. This suppresses such a situation that noise generated on the power source side of the electrical wire 21, 22, or 23 propagates to the load side of the other electrical wires 21, 22, and 23 while passing through the magnetic core 30. Thus, the routing structure 20 of electrical wires and the wire harness 1 of the first modified example can effectively suppress propagation of noise from the power source side of the magnetic core 30 to the load side. In a similar manner, propagation of noise from the load side of the magnetic core 30 to the power source side can be effectively suppressed.

Second Modified Example of Embodiment

Figure 12:
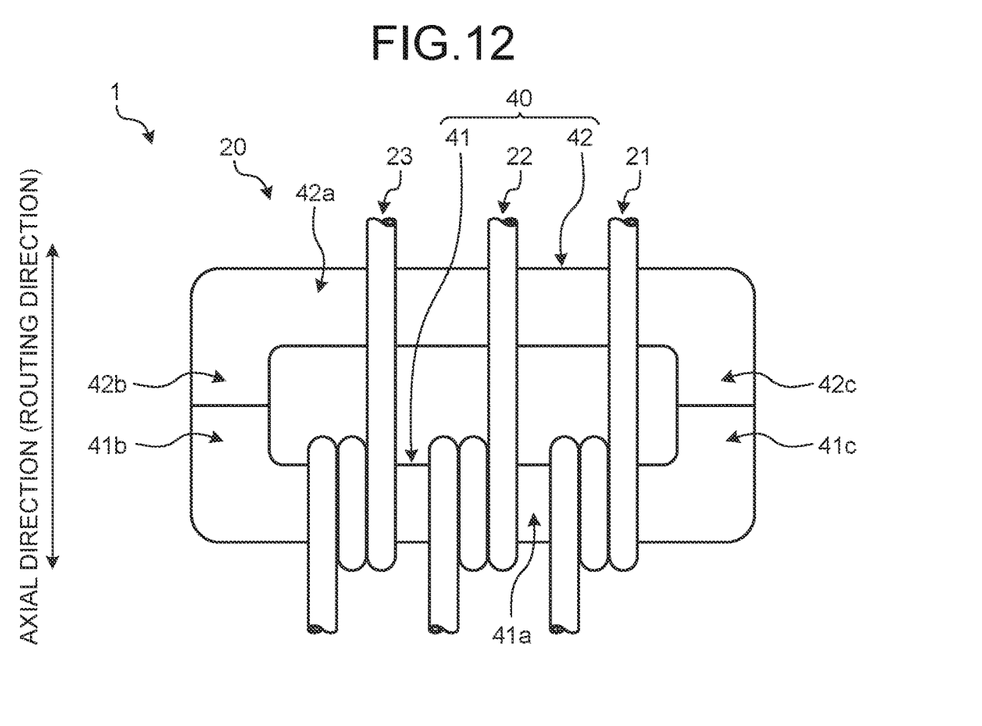
FIG. 12 is a main part plan view of a routing structure of electrical wires according to a second modified example of the embodiment.

The second modified example of the embodiment will be described with reference to FIG. 12. FIG. 12 is a main part plan view of a routing structure of electrical wires according to the second modified example of the embodiment. A magnetic core 40 of the second modified example is different from the magnetic core 30 of the above-described embodiment in a planar shape. Similarly to the magnetic core 30 of the above-described embodiment, the magnetic core 40 of the second modified example is of a division type in which a first component 41 constituting a part of a ring shape, and a second component 42 constituting a remaining part of the ring shape are connected.

A planar shape of the magnetic core 40 is substantially rectangle, and four corners are slightly rounded. The first component 41 includes a first columnar portion 41a, and second columnar portions 41b and 41c. The first columnar portion 41a and the second columnar portions 41b and 41c each have a square column shape. The second columnar portions 41b and 41c are orthogonal to the first columnar portion 41a. The second columnar portions 41b and 41c are bent toward the same direction with respect to the first columnar portion 41a. The second component 42 is substantially similar to the first component 41, and includes a first columnar portion 42a, and second columnar portions 42b and 42c. The electrical wires 21, 22, and 23 are winded around the first columnar portion 41a.

The magnetic core 30 of the above-described embodiment and the magnetic core 40 of the second modified example each illustrate an example of a specific mode of a magnetic core. The shape and the division mode of the magnetic core 30 or 40 may be appropriately modified. For example, a cross sectional shape of the magnetic core 30 or 40 may be a circular shape, another shape, or the like. The shape of the first component 31 or 41 and the shape of the second component 32 or 42 may be asymmetric. The connection between the first component 31 or 41 and the second component 32 or 42 may not be achieved by another member such as the connection members 33. For example, the first component 31 or 41 and the second component 32 or 42 may be connected by being fitted, into a recessed portion provided in one of them, a protruding portion provided on the other one thereof.

The method of winding the electrical wires 21, 22, and 23 around the magnetic core 30 or 40 is not limited to the exemplified method. For example, the electrical wires 21, 22, and 23 with the same phase may be winded around the magnetic core 30 or 40 in an overlapped manner so as to form a plurality of layers.

The matters disclosed in the above-described embodiment and modified examples can be executed while being appropriately combined.

The routing structure of electrical wires and the wire harness according to the present embodiment include the multi-phase electrical wires, and the magnetic core having a ring shape, around which the electrical wires are winded, and the magnetic core is of a division type in which the first component constituting a part of the ring shape, and the second component constituting a remaining part of the ring shape are connected. According to the routing structure of electrical wires and the wire harness according to the present embodiment, winding of the electrical wires can be performed in a state in which the first component and the second component are separated. Thus, a region area on an inner diameter side in a state in which the first component and the second component are connected can be set to a minimum region area not including a working clearance gap. Thus, the routing structure of electrical wires and the wire harness according to the present embodiment cause such an effect that a routing space can be miniaturized by the miniaturization of the magnetic core.

Although the invention has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A routing structure of electrical wires, the routing structure comprising:
   multi-phase electrical wires; and
   a magnetic core having a ring shape, around which the electrical wires are winded, wherein
   the magnetic core has a division in which a first component constituting a part of the ring shape, and a second component constituting a remaining part of the ring shape are connected,
   the electrical wires with all phases are only winded around the first component,
   the first component and the second component have curved portions which are bent from a columnar portion of the first component or second columnar portions which are bent from the first columnar portion of the first component toward the same direction,
   the routing structure further includes connection members which are members different from the first component and the second component and connect the first component and the second component at both end portions in the longitudinal direction of the magnetic core, and
   the connection members include holding portions that hold the end portions of the first component and engagement portions to be engaged with engagement protrusions of the second component.

2. The routing structure of electrical wires according to claim 1, wherein in the first component, the electrical wires are winded around a portion extending in a direction orthogonal to a routing direction of the electrical wires.

3. The routing structure of electrical wires according to claim 1, wherein
   the first component and the second component are symmetric with respect to a center line in a longitudinal direction of the magnetic core.

4. The routing structure of electrical wires according to claim 1, wherein
   a planar shape of the holding portions has a curved shape according to a shape of the curved portions of the first component, and
   the engagement portions are plate-like portions protruding from the holding portions, and sandwich the second component from a front surface side and a rear surface side.

5. A wire harness comprising:
   multi-phase electrical wires;
   a magnetic core having a ring shape, around which the electrical wires are winded; and
   a connection portion provided at a terminal of the electrical wires, wherein
   the magnetic core has a division in which a first component constituting a part of the ring shape, and a second component constituting a remaining part of the ring shape are connected,
   the electrical wires with all phases are only winded around the first component, and
   the first component and the second component have curved portions which are bent from a columnar portion of the first component or second columnar portions which are bent from the first columnar portion of the first component toward the same direction
   the routing structure further includes connection members which are members different from the first component and the second component and connect the first component and the second component at both end portions in the longitudinal direction of the magnetic core, and
   the connection members include holding portions that hold the end portions of the first component and engagement portions to be engaged with engagement protrusions of the second component.

* * * * *